Jan. 15, 1963   E. C. ELSNER   3,072,992
GRIP FITTING
Filed April 11, 1960

INVENTOR.
EDWIN C. ELSNER
BY Huebner & Worrel
ATTORNEYS.

United States Patent Office 3,072,992
Patented Jan. 15, 1963

3,072,992
GRIP FITTING
Edwin C. Elsner, Pasadena, Calif., assignor to Aeroquip Corporation, Jackson, Mich., a corporation of Michigan
Filed Apr. 11, 1960, Ser. No. 21,539
3 Claims. (Cl. 24—211)

This invention relates to a device for releasably attaching any object to a stud, and more particularly, it relates to a device useful in lifting and carrying relatively heavy objects which, although heavy and often bulky, nevertheless require careful, secure handling. Such a fitting would be especially useful in handling such objects as heavy missile parts.

An object of the invention is to provide a sturdy fitting which may be secured quickly, easily and firmly to a stud, which may be quickly and easily removed from its attachment to said stud, and which provides a solid mechanical abutment between a stationary part of the fitting and a pivoted part of the fitting which greatly increases the total strength of the fitting over similar fittings.

A further object of the invention is to provide such a fitting which has a minimal number of moving parts.

Another object of the invention is to provide such a device which is easy and inexpensive to manufacture and assemble, and simple to install in operative position.

With these and other objects in view, the invention consists of the construction, arrangement and combination of the various parts of the device whereby the objects contemplated are attained, as hereinafter set forth, pointed out in the appended claims, and illustrated in the accompanying drawings.

Figure 1:
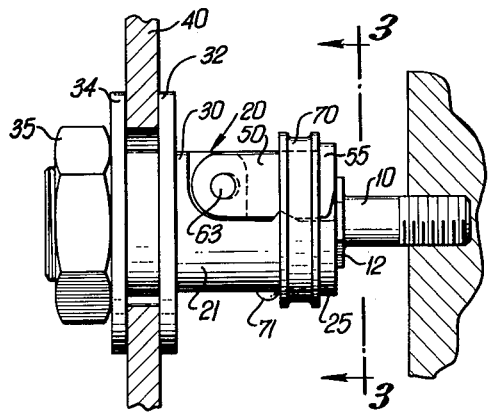
FIGURE 1 is a side elevational view of the device, partly in section.

A protruding stud 10 may be mounted on an object to be lifted and carried. It has an annular flange at its outer end, forming a head 11. Spaced apart from said head 11 in parallel relationship thereto is a second annular flange 12, forming between said flange 12 and said head 11 a recessed seat 13.

It will be understood that, as described above, the stud 10 is mounted on the object to be lifted and carried, and that, consequently, the fitting hereinafter described is mounted on the lifting and carrying body, such as a lift truck, but that said parts may be reversed, if desired, with the fitting mounted on the object to be lifted and carried, and the stud mounted on the lifting and carrying body.

A fitting 20 has a semi-cylindrical body portion 21 adjacent one end of which is a recess 22. At said end of body 21 is an inwardly directed annular flange 23 which defines one side of said recess 22. Recess 22 is of sufficient dimensions to accommodate head 11 of stud 10 when fitting 20 is mounted on stud 10 as hereinafter described. Similarly, flange 23 is of sufficient dimensions to be snugly disposed in seat 13 when the fitting 20 is mounted on the stud 10.

An outwardly extending spur 24 is formed on one surface of body portion 21 at the edge of the other side of recess 22. Also at said end of body 21 is an outwardly directed annular flange 25.

Fitting 20 has a full cylindrical body portion 30 formed at the other end of semi-cylindrical body portion 21, which said full cylindrical body portion 30 has an outwardly directed annular flange 31 at the end thereof adjacent said semi-cylindrical body portion 21, said flange being disposed so as to form a seat for a washer 32. The outside surface of said full cylindrical body portion 30 is preferably externally threaded as at 33, and has a washer 34 and a nut 35 mounted thereon for easy attachment of fitting 20 to a body 40.

Pivotally mounted adjacent one end thereof on full cylindrical body portion 30, in the manner hereinafter described, in matching relation to semi-cylindrical body portion 21, is a semi-cylindrical dog 50. Adjacent the free end of said dog 50 is a recess 51, in aligned relationship to recess 22 in body portion 21 when the device is in closed position. At said free end of dog 50 is an inwardly directed annular flange 52 which defines one side of said recess 51. Recess 51, like recess 22, is of sufficient dimensions to accommodate head 11 of stud 10, and forms with recess 22 a chamber for that purpose. Similarly, flange 52 is of sufficient dimensions to be snugly disposed in seat 13 when fitting 20 is mounted on stud 10.

An outwardly directed annular flange 55 is formed at the free end of dog 50.

A recess 53 is formed on one surface of dog 50 and disposed so as to receive and accommodate spur 24 when the device is in closed position.

Figure 4:
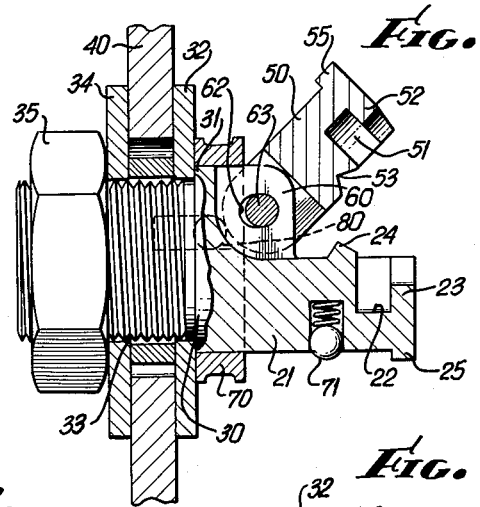
FIGURE 4 is an enlarged vertical cross-sectional view of the device through the center thereof, with the teeth open and the stud removed.

Dog 50 has a slotted opening 54 therein, positioned so as to receive a protruding lip 60 formed on full cylindrical body portion 30, said lip 60 being freely disposed in said slotted opening 54. A bore 61 having a substantially circular cross-section is disposed in dog 50 on both sides of slotted opening 54. Said bore 61 is aligned with a bore 62 in lip 60, said bore 62 having a substantially elliptical cross-section. A pivot pin 63 is disposed in said aligned bores 61 and 62, and the spaced relationship between said elliptical bore 62 and said recess 53 and spur 24 is such that some relative lateral movement between dog 50 and body portion 21 is accomplished when the device is moved from the closed position shown in FIGURES 1 and 2 of the drawings to the full open position shown in FIGURE 4 of the drawings.

Figure 2:
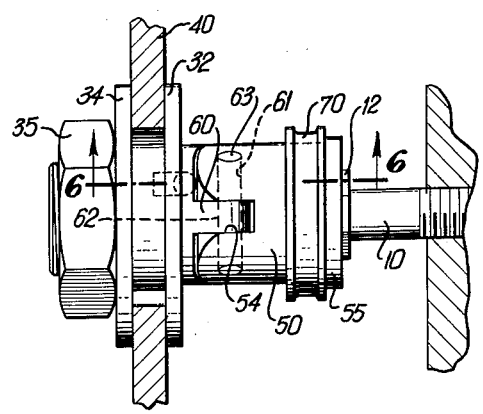
FIGURE 2 is a top plan view of the device, also partly in section.
Figure 3:
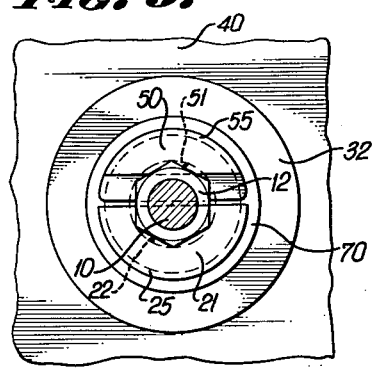
FIGURE 3 is a view taken on the line 3—3 of FIGURE 1.

A locking ring 70 is slidably mounted on fitting 20 so as to encompass flange 31 of body portion 30, and body portion 21 and dog 50 when the device is in the closed position shown in FIGURES 1 and 2. It is captured between washer 32 and aligned flanges 25 and 55. A spring actuated ball detent assembly 71 is operatively mounted on the surface of body portion 21 so as to releasably restrain ring 70 in abutting position against flanges 25 and 55 when the device is in closed position.

A second spring-actuated ball detent assembly 80 is mounted on body portion 30 so as to bias dog 50 away from said body portion 30.

Figure 5:
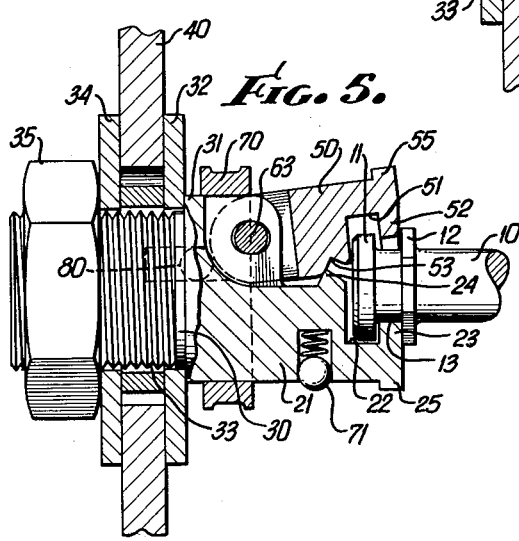
FIGURE 5 is a view similar to FIGURE 4, but with the stud in place and the teeth partially closed.
Figure 6:
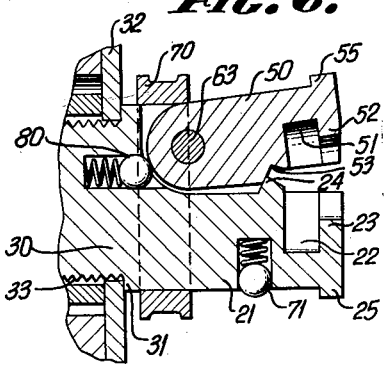
FIGURE 6 is an enlarged detailed view of a portion of the device somewhat similar to the view of FIGURE 5, but off center, on the line 6—6 of FIGURE 2.

In operation, fitting 20 is mounted on the body 40 of a lifting-carrying vehicle. Ring 70 is disposed over flange 31, leaving dog 50 free for pivotal movement to open position. Dog 50 is then moved to the open position shown in FIGURE 4, against the biasing pressure of the spring-actuated ball detent of assembly 80. Fitting 20 is then brought into contact with stud 10 on the object to be lifted and carried, and head 11 is disposed in recess 22, while flange 23 is disposed in seat 13 of stud 10. Dog 50 is then pivoted from the open position shown in FIGURE 4 to the partially closed position illustrated in FIGURE 5, at which point one side of recess 53 abuts against one side of spur 24. As the closing movement continues, the biasing action of said abutment causes dog 50 to move slightly rearwardly toward full cylindrical body portion 30 against the biasing action of ball detent assembly 80 until spur 24 is firmly seated in recess 53, forming a solid mechanical abutment between semi-cylindrical body portion 21 and dog 50, at which point head 11 of stud 10 will be disposed in recess 51, while flange 52 is disposed in seat 13 of stud 10, and semi-cylindrical body portion 21 and dog 50 in contact therewith form a full cylindrical body.

Locking ring 70 is then slid along dog 50 and body portion 21, and over detent assembly 71, until it is in abutment with aligned flanges 25 and 55, and held in that position by detent assembly 71, whereupon fitting 20 will be firmly locked on stud 10.

Unlocking is accomplished by sliding ring 70 out of abutment with flanges 25 and 55, and over detent assembly 71, until it comes to rest on flange 31, again leaving dog 50 free to pivot to open position.

Although I have herein shown and described my invention in what I have conceived to be the most practical and preferred embodiment, it is recognized that departures may be made therefrom within the scope of my invention, which is not to be limited to the details herein disclosed, but is to be accorded the full scope of the claims so as to embrace any and all equivalent structures and devices.

What is claimed is:

1. An attachment fitting comprising a body portion, an extension on said body portion, a dog pivotally mounted on said body portion and swingable from a first position to a second position overlying said extension, said pivotal mounting including elongated slot means to permit longitudinal as well as pivotal movement of said dog relative to said body portion, said extension and said dog having cooperating portions forming a chamber when said dog is in said second position, means for releasably securing said dog to said extension, and biasing means carried by said body engaging said dog and urging said dog outwardly of said body portion, said dog and said extension having cooperating camming surfaces adapted to urge said dog against said biasing means when said dog is moved from said first position into said second position.

2. An attachment fitting comprising a body portion, an extension on said body portion, a spur on said extension, a dog pivotally mounted on said body portion and swingable from a first position to a second position overlying said extension, said pivotal mounting including elongated slot means to permit longitudinal as well as pivotal movement of said dog relative to said body portion, said extension and said dog having cooperating portions forming a chamber when said dog is in said second position, said dog having a recess for receiving said spur when said dog is in said second position, means for releasably securing said dog to said extension, and biasing means carried by said body engaging said dog and urging said dog outwardly of said body portion, said recess and spur having cooperating camming surfaces adapted to urge said dog against said biasing means when said dog is moved from said first position into said second position.

3. An attachment fitting adapted to be secured to a structure, said fitting comprising: a cylindrical body portion; a semi-cylindrical body portion at one end of said cylindrical body portion; a spur on the surface of said semi-cylindrical body portion; a semi-cylindrical dog pivotally mounted on said cylindrical body portion and movable from a first position to a second position overlying said semi-cylindrical body portion to thereby form a generally cylindrical configuration, said pivotal mounting including elongated slot means to permit longitudinal as well as pivotal movement of said dog relative to said body portion; a chamber formed by aligned portions of said dog and said semi-cylindrical body portion adapted to receive said structure; there being a recess on the surface of said dog aligned with said spur; spring means carried by said cylindrical body portion engageable with said dog and urging said dog outwardly of said body portion; and a locking ring disposed around said semi-cylindrical body portion and said dog to hold said semi-cylindrical body portion and said dog in said cylindrical configuration and being movable to said cylindrical body portion to thereby release said dog; said recess and said spur having cooperating camming surfaces adapted to urge said dog against said spring means in response to movement of said dog from said first position to said second position.

References Cited in the file of this patent

UNITED STATES PATENTS 252,502    Orrick    Jan. 17, 1882
2,742,307    Elsner    Apr. 17, 1956